United States Patent [19]

Kobayashi

[11] 4,374,591
[45] Feb. 22, 1983

[54] STRUT-TYPE STEERING SKI SUSPENSION FOR SNOWMOBILES

[75] Inventor: Takashi Kobayashi, Hamamatsu, Japan

[73] Assignee: Yamaha Hatsudoki Kabushiki Kaisha, Iwata, Japan

[21] Appl. No.: 160,471

[22] Filed: Jun. 18, 1980

[30] Foreign Application Priority Data

Jun. 27, 1979 [JP] Japan .................................. 54-80240

[51] Int. Cl.³ .............................................. B62B 17/04
[52] U.S. Cl. .................................... 280/21 R; 280/26
[58] Field of Search ................ 280/21 R, 21 A, 25, 280/26, 16; 180/190, 192, 193, 194, 195, 196

[56] References Cited

U.S. PATENT DOCUMENTS

| | | | |
|---|---|---|---|
| 2,358,817 | 9/1944 | Meehan | 280/25 R |
| 3,425,707 | 2/1969 | Horiuchi et al. | 280/21 R |
| 3,692,130 | 9/1972 | Stacy | 180/184 |
| 3,931,862 | 1/1976 | Cote | 280/21 R |
| 3,977,485 | 8/1976 | West et al. | 280/21 R |

*Primary Examiner*—John A. Pekar
*Attorney, Agent, or Firm*—Donald D. Mon

[57] ABSTRACT

A strut-type steering ski suspension having minimal height for a given stroke. The suspension includes shock-absorber means with a movable cylinder and a fixed rod, the rod being fixed relative to the frame of the snowmobile. A ski is mounted to the lower end of the movable cylinder. A bias spring is incorporated in the suspension, which bears in compressive opposition between the lower portion of the movable cylinder and the rod or some other structure which is fixed to the frame, thereby utilizing otherwise "dead" space for the spring, and shortening the length of suspension needed for a given stroke length.

8 Claims, 9 Drawing Figures

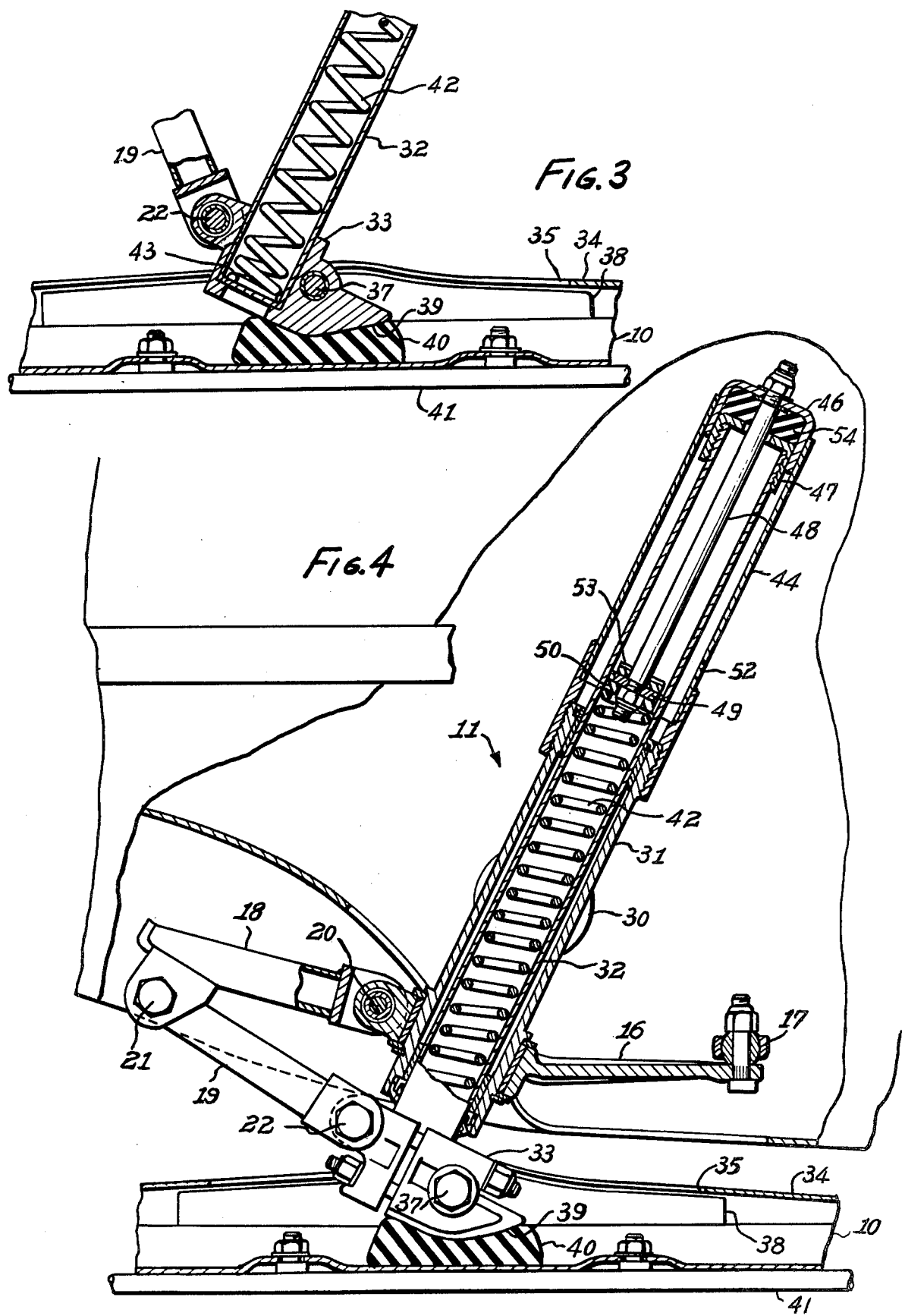

STRUT-TYPE STEERING SKI SUSPENSION FOR SNOWMOBILES

FIELD OF THE INVENTION

This invention relates to strut-type steering ski suspensions for snowmobiles.

BACKGROUND OF THE INVENTION

The performance, durability and reliability of the engines and chassis of snowmobiles have recently been remarkably improved. These improvements have given rise to requirements for better running comfort and stability.

In order to meet these requirements, in place of the leaf spring type steering ski suspension system that has been widely employed, there has been proposed the use of the so called strut type steering ski suspension system. This system is suitable for increasing the upward and downward movable range (cushion stroke) of the steering ski. The strut-type steering ski suspension system is equipped with a stationary cylinder fixed to a frame, a movable cylinder slidably fitted in the stationary cylinder, and a steering ski attached to the lower end portion of the movable cylinder. The movable cylinder is biased to return downward.

The drivability and stability of a snowmobile having a right and left steering ski can be improved by widening the spacing (tread) between the steering skis. If, however, the aforementioned strut type steering ski suspension system is adapted to increase the cushion stroke, the suspension system will be vertically elongated so much that it will protrude from the chassis. The chassis is formed in a generally rounded configuration at the engine cowl. This results in a disadvantage that the tread must be narrowed thereby to sacrifice the drivability and stability, or that the tread must be widened thereby to sacrifice the design acceptability of the engine cowl.

In a strut-type suspension system according to the prior art, when a compression coil spring is used, the compression coil spring is mounted between the upper end of the movable cylinder and the frame side so that it might not be rendered inoperative by the snow frozen thereat. It has therefore been necessary to retain at an upper portion of the suspension system the length of the compression coil spring under compression, i.e., the length corresponding to that when it is compressed with its turns contacting ("compressed length"). Since this length becomes larger as the cushion stroke is increased, it has been difficult to reduce the vertical length of the suspension system as a whole while leaving the cushion stroke long as it is.

The present invention has been conceived in view of these circumstances, and contemplates to provide a steering ski suspension system for snowmobiles which has its vertical length minimized while still making it possible to provide a sufficiently large cushion stroke.

BRIEF DESCRIPTION OF THE INVENTION

This invention contemplates the use of a compression spring which is, however, inside the movable cylinder so that its compressed length is not additive to the other parameters of its system.

The above and other features of this invention will be fully understood from the following detailed description and the accompanying drawings, in which:

BRIEF DESCRIPTION OF THE DRAWINGS

FIG. 3 is a sectional side elevation showing the vicinity of the lower end portion of the movable cylinder of the suspension system;

FIG. 4 is a partially sectional side elevation showing the suspension system under its full "bump" condition;

DETAILED DESCRIPTION OF THE INVENTION

Figure 1:
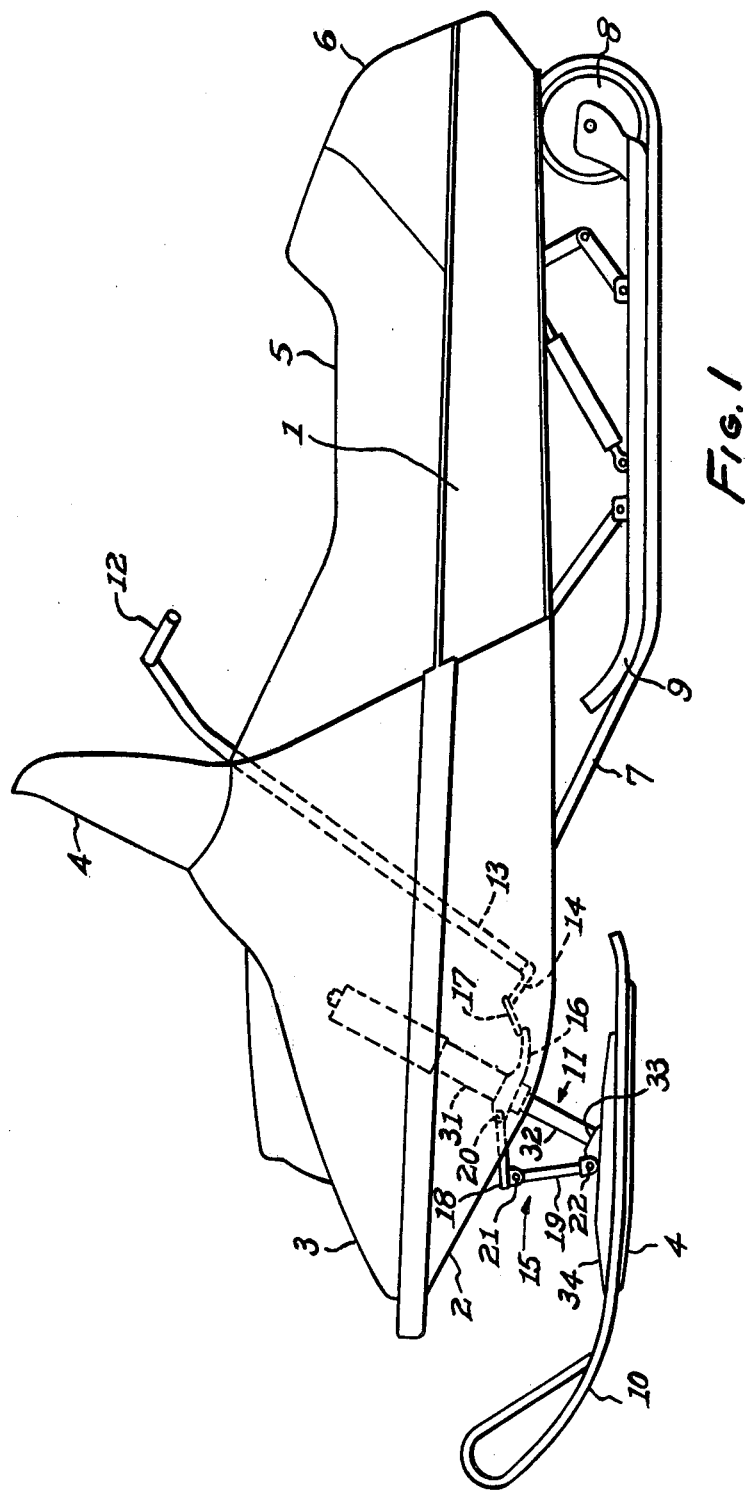
FIG. 1 is a side elevation showing a snowmobile to which one embodiment of the present invention is applied.

In FIG. 1, there is shown a frame 1, a bottom cover 2, an engine cowl 3, a windshield 4, a seat 5, and a rear luggage trunk 6, respectively. A track (of the endless type) has its front end made to engage a drive sprocket wheel (not shown). The rear end of the track runs on a guide wheel 8, which is elastically urged onto the ground (snow surface) by the action of a slide rail type suspension system.

A pair of right and left steering skis 10 are disposed below a strut type steering ski suspension system 11. A steering bar 12 and a steering column 13 are shown. Rotational motions of steering bar 12 are transmitted to steering ski 10 through an arm 14 fixed to the lower end of steering column 13 and a link mechanism 15.

An arm 16 is rotatably held on the outer circumference of a stationary cylinder 31 of the suspension system 11, which will be described later. The pivotal motions of the aforementioned arm 14 are transmitted to the arm 16 by means of a link 17. The pivotal motions of the arm 16 are transmitted to the steering ski 10 through links 18 and 19. The connecting pins 20, 21 and 22 between the adjacent two of the arm 16, the links 18 and 19 and the steering ski 10 are attached so that they are directed sidewise of the chassis when the steering ski 10 is in its forward direction. The connecting pins are therefore parallel to one another.

A pipe 30 is fixed to frame 1. Stationary cylinder 31 is inclined so that its lower end is positioned in front of its upper end. A movable cylinder 32 is held in the stationary cylinder 31 such that it can move up and down and also rotate. Movable cylinder 32 protrudes upward and downward from the stationary cylinder 31, and steering ski 10 is mounted to its lower end. For this purpose, a bracket 33 is fastened and fixed to the lower end of movable cylinder 32. Bracket 33 is inserted into the opening 35 of a mounting member 34 that has a C-shaped section, which is integrally fixed to the upper sides of steering ski 10, and is attached by means of a through-bolt 37 which extends through the bracket 33 to cross the steering ski 10 as well as the side walls 36 of opening 35. The steering ski can then rock around bolt 37 with respect to bracket 33.

Figure 2:
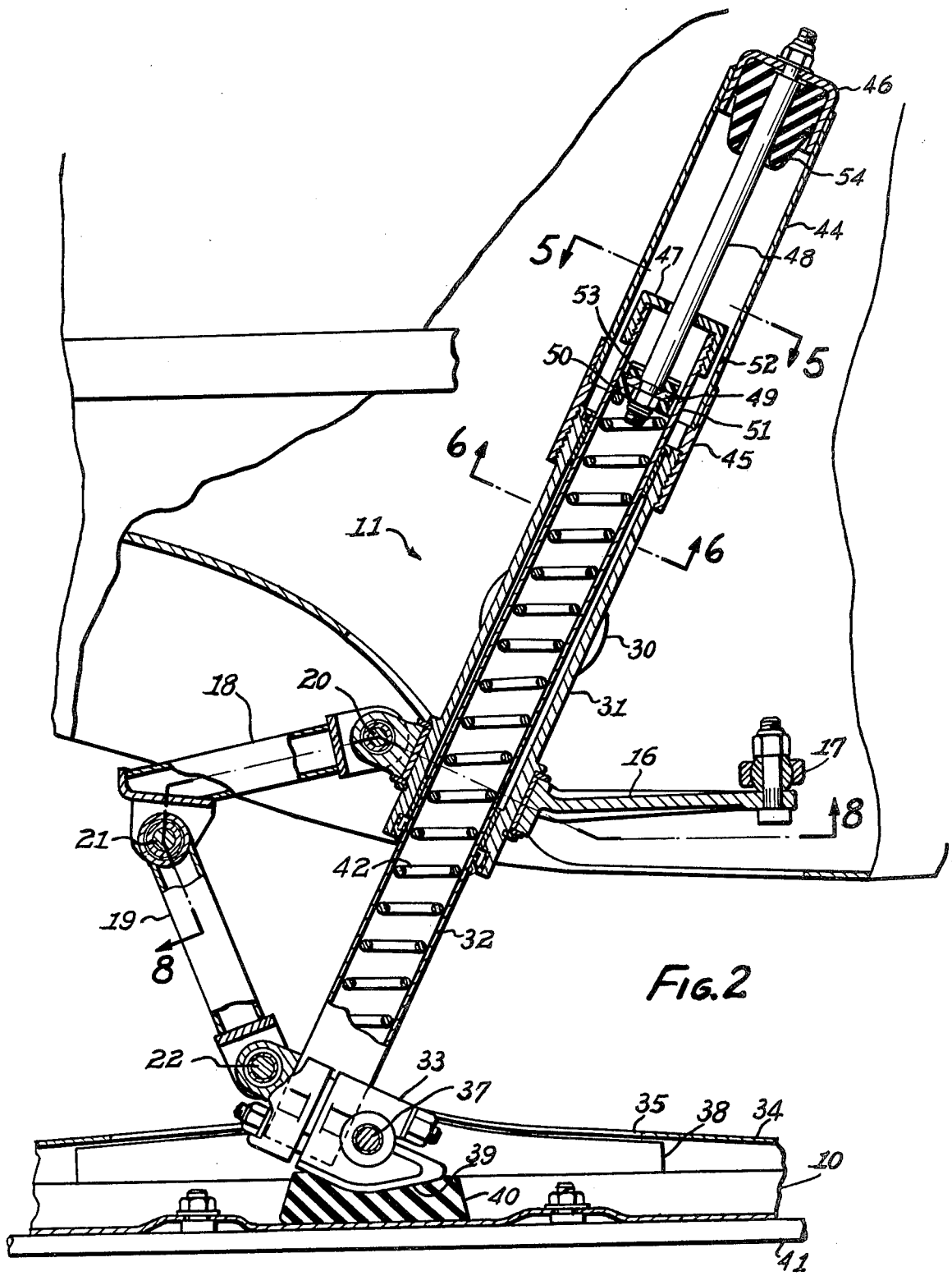
FIG. 2 is a side elevation showing, in partial section, the steering ski suspension system of the snowmobile under its stationary condition.
Figure 5:
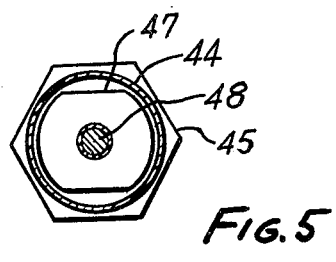
FIGS. 5 and 6 are sections taken along lines V—V and VI—VI in FIG. 2, respectively.
Figure 6:
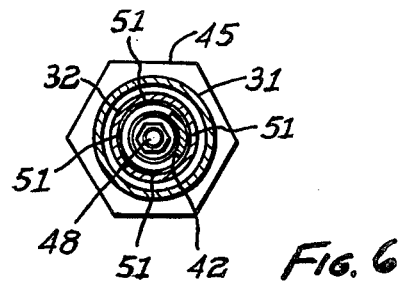
Figure 7:
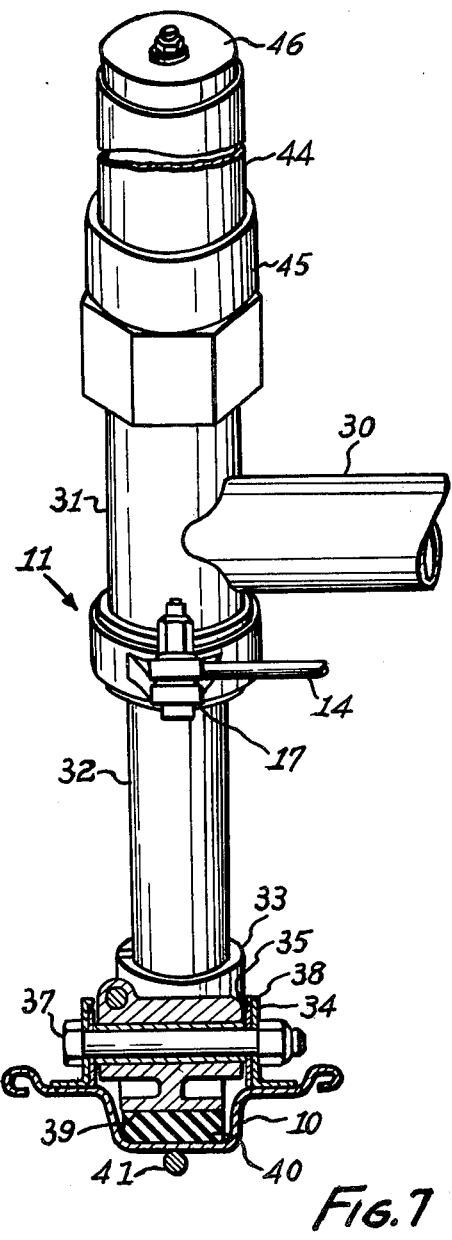
FIG. 7 is a partially sectional rear elevation of FIG. 1.
Figure 8:
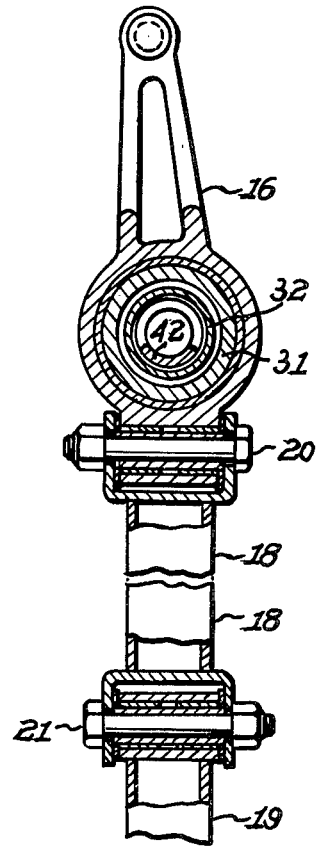
FIG. 8 is a section taken along line VIII—VIII in FIG. 2.

Reinforcing plates 38 are fixed to the inner side of side walls 36. The bottom side 39 of bracket 33 is curved, as shown in FIG. 2, and an elastic member 40 is sandwiched between bottom side 39 and steering ski 10. As a result, steering skis 10 are biased to return to their horizontal position by elastic member 40. Ski runners 41 are fixed to the sliding sides of the steering ski 10.

There is mounted in movable cylinder 32 a compression coil spring 42 which functions as a shock absorber means. Its lower end abuts against inner bottom wall 43 of movable cylinder 32 (as shown in FIG. 3).

A cylinder 44 is attached to the upper end of the stationary cylinder 31 for this purpose. To cylinder 44, there is integrally fixed a cylindrical member 45 which in turn is screwed on the outer circumference of the upper end of the stationary cylinder 31. A cap member 46 is fixed to the upper end of cylinder 44.

A cap 47 is screwed onto the upper end of movable cylinder 32, and the upper end of a rod 48 is fixed to cap member 46, so it extends through the cap 47 into movable cylinder 32. The upper end of compression coil spring 42 is retained on the lower end portion of rod 48. For this purpose, to the lower end portion of the rod 48 there is fixed a washer 49, on which there is rotatably retained a bearing member 50 made of a synthetic resin. On the lower side of it there is retained the upper end of compression coil spring 42. Bearing member 50 is in rotatable abutment against the washer 49. Since rod 48 is fixed to the stationary cylinder 31 through the extending cylinder 44, the upper end of the aforementioned coil spring 42 is held to the frame.

Bearing member 50 has formed in its outer circumference a communication groove 51 which provides communication between the upper and lower spaces of the bearing member 50 so that air can flow through communication groove 51 in accordance with the upward and downward movements of the movable cylinder 32. The inside of movable cylinder 32 is vented to the atmosphere through the gap between the aforementioned cap 47 and rod 48 and through a vent hole 52 which is formed in cylinder 44.

There is mounted on the upper side of the washer 49 a rebound stopper 53 which is formed in its upper side with radial roughnesses. A full bump stopper 54 is mounted on the inner side of cap member 46. Thus, movable cylinder 32 has its upward and downward movable range regulated by having its cap 47 abutting against rebound stopper 53 or full bump stopper 54. In short, the aforementioned cap 47 is made to act as a stopper.

Movable cylinder 32, which is located under its stationary condition at the position shown in FIG. 2, is moved upward by the pushing-up force of the steering ski 10 coming from the ground (snow surface). Movable cylinder 32 can be brought to the position of FIG. 4, in which cap 47 is in abutment against the full bump stopper 54. As is apparent from FIG. 4, compression coil spring 42 can be substantially positioned within the stationary cylinder 31 when coil spring 42 is maximally compressed. The length of coil spring 42 is necessarily required for slidably holding movable cylinder 32 in stationary cylinder 31, and the length of suspension system 11 is minimized if the length of cylinder 44 and rod 48 are made substantially equal to the cushion stroke of the steering ski 10.

Since, in this embodiment, cap 47 is used as the stopper, it becomes unnecessary to attach any special parts for a stopper or to reinforce the vicinity of the stopper. Thus, the construction can be simplified. In this embodiment, although the shock absorbing means is composed only of the compression coil spring 42, it is also suitable for a conventional fluid-restrictor type shock absorber to be mounted in the compression coil spring 42 so that the shock absorbing means may then be composed of the coil spring 42 and a conventional shock absorber.

Figure 9:
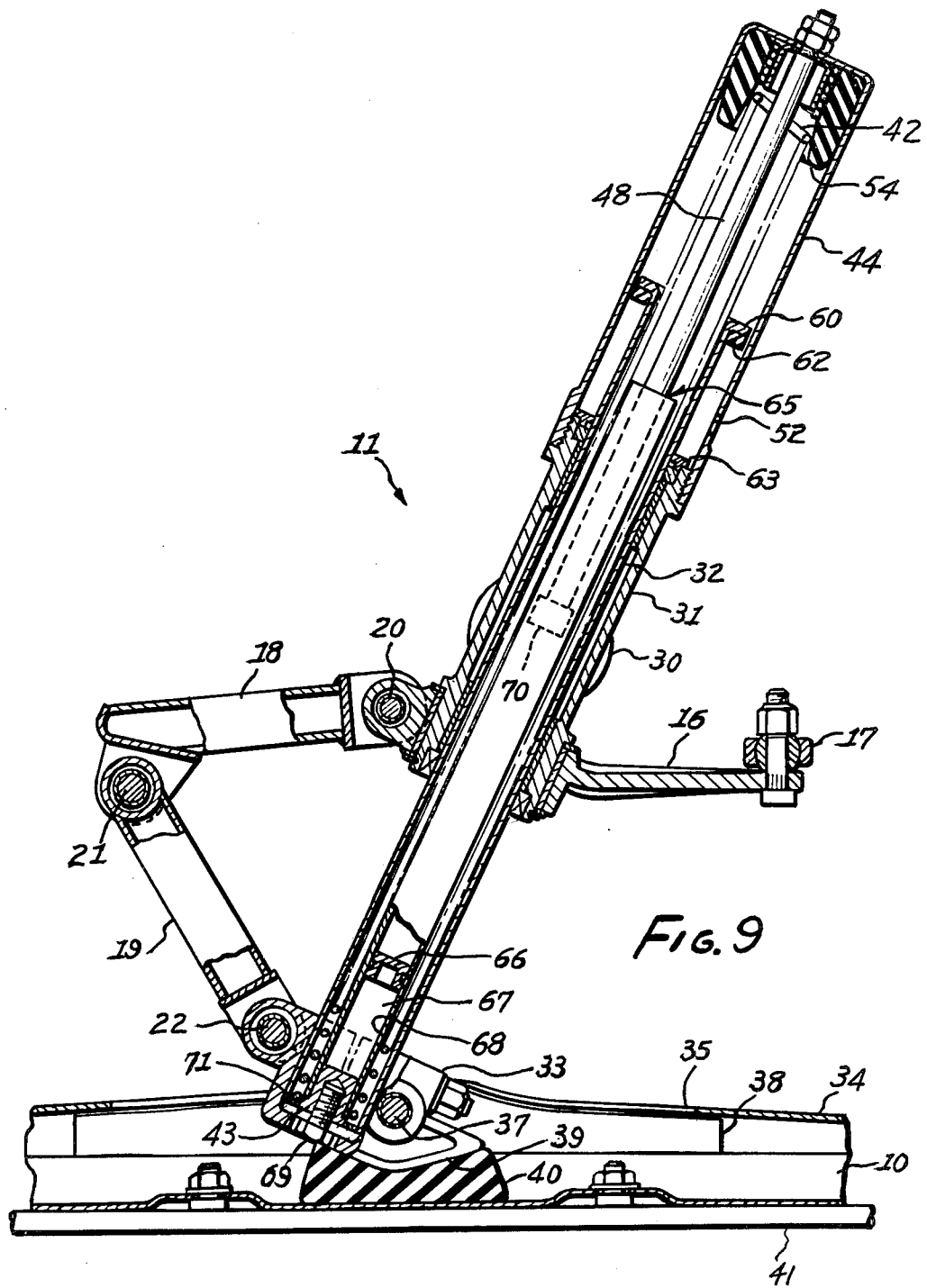
FIG. 9 is a side elevation showing, in partial section, another embodiment of the invention.

Another embodiment of the present invention will now be described with reference to FIG. 9 showing the longitudinal side elevation thereof. In this Figure, the same parts as those of the first embodiment are indicated by the same numerals, and their repeated explanations are omitted here. In this second embodiment, cylinder 44 is integrally formed into a bottomed cylindrical shape and is screwed directly on the upper end of the stationary cylinder 31. On the other hand, the upper end portion of movable cylinder 32 is formed with a flange 60, to the lower face of which a rebound stopper 62 is fixed. There is attached to the upper end face of the stationary cylinder 31 a seat 63 which is to be seated upon the rebound stopper 62. Thus, flange 60 acts as limiting means which is operative to abut, during full bump operation, against the generally cylindrical full bump stopper 54 and to bring the rebound stopper 62 into abutment against seat 63 during the rebound operation.

On the other hand, the upper end of the compression coil spring 42 extends above movable cylinder 32 to where it is retained on the inner side of the extending cylinder 44.

Numeral 65 indicates a shock absorber, which is formed with a preload gas chamber 67 that is partitioned by a free piston 66 and which is coaxially mounted in coil spring 42. The shock absorber 65 has its cylinder 68 removably attached to inner bottom wall 43 of movable cylinder 32, and has its piston 70 attached to the rod 48. In turn it is fixed to cylinder 44.

In this embodiment coil spring 42 is made to protrude into the extending cylinder. It can be longer than that of the embodiment shown in FIGS. 1 to 8 thereby to increase the degree of freedom in design. Moreover, since the inside space of the coil spring 42 is used as the mounting chamber for shock absorber 65, the dead space can be used effectively so that suspension system 11 can be made remarkably compact.

Moreover, shock absorber 65 can be removed without difficulty by loosening bolt 69 and extracting rod 48 from extending cylinder 44. As a result, the operating specifications of the snowmobile can be changed merely by attaching and detaching the shock absorber 65. For example, the shock absorber can be mounted on a snowmobile of a higher grade and demounted from a snowmobile of a lower grade while enabling other parts to be commonly used. That is to say, it is possible to make many parts commonly usable.

Since, in this embodiment, the lower end portion of coil spring 42 is pushed against inner bottom wall 43 through a washer 71, slippage takes place between washer 71 and inner bottom wall 43, so that the coil spring 42 will not be twisted when the ski is turned.

In both of the embodiments thus far described, because the lower end of coil spring 41 is pushed against inner bottom wall 43 of movable cylinder 32 either directly, or indirectly through washer 71, the dead space can be substantially completely effectively used. However, the present invention is not limited to the above constructions, but the desired objects can be attained even if the lower end of coil spring 42 is held in the vicinity of inner bottom wall 43 of movable cylinder 32.

According to the present invention, moreover, movable cylinder 32 can be restricted to up and down movement, and ski 10, can be pivotally attached to movable cylinder 32.

As has been described hereinbefore, since the shock absorbing means is mounted between the vicinity of the inner bottom wall of the movable cylinder and the frame side in accordance with the present invention, the vicinity of the inner bottom wall of the movable cylinder can be effectively used so that the total length of the suspension system can be accordingly reduced. As a result, even in a snowmobile equipped with paired right and left steering skis, the tread of the steering ski can be widened without sacrificing the design, and the drivability and stability can be improved.

This invention is not to be limited by the embodiments shown in the drawings and described in the description, which are given by way of example and not of limitation, but only in accordance with the scope of the appended claims.

I claim:

1. In a steering ski suspension for a snowmobile, said snowmobile having a frame, said suspension including a stationary cylinder fixed to said frame a movable cylinder slidably mounted in said stationary cylinder, and a ski mounted to the lower end of said movable cylinder so as to turn therewith, the improvement comprising: a cap member fixed to the upper end of said stationary cylinder; and coil spring bias means entirely confined within one of said cylinders and compressively opposed between a lower portion of said movable cylinder and said cap member or structure rigidly attached to said cap member, said movable cylinder being rotatably and axially movable in said stationary cylinder whereby to make the ski steerable and to provide an elastic suspension for said frame.

2. Apparatus according to claim 1 in which said spring bias means bears against said cap member, and comprises a coil spring which surrounds said movable cylinder.

3. Apparatus according to claim 2 in which a flange is provided on each of said cylinders, said flanges facing one another, and in which stopper means is interposed between said flanges to limit the extension excursion of said movable cylinder by simultaneous abutment of both of said flanges against said stopper.

4. Apparatus according to claim 1 in which said structure comprises a rigid rod projecting from said cap member into said movable cylinder, said spring bias means comprising a coil spring contained inside said movable cylinder, and an apertured cap fixed to the upper end of said movable cylinder which passes said rod.

5. Apparatus according to claim 4 in which said rod also functions as a portion of a fluid transfer shock absorber to impede shocks by limiting the rate of flow of fluid across it.

6. Apparatus according to claim 4 in which said bias spring means is rotationally free where it opposes said movable cylinder.

7. Apparatus according to claim 4 in which a flange is provided on said rod, and in which stopper means is interposed between said cap and said flange to limit the extension excursion of said movable cylinder by simultaneous abutment of said cap and said flange against said stopper.

8. Apparatus according to claim 1 in which stopper means is placed inside said fixed cylinder, against said cap member to limit the compressive excursion of said movable cylinder by abutment with said stopper means.

* * * * *